United States Patent [19]

Kurakake et al.

[11] Patent Number: 4,816,734
[45] Date of Patent: Mar. 28, 1989

[54] SPEED CONTROL SYSTEM

[75] Inventors: Mitsuo Kurakake, Hino; Keiji Sakamoto, Hachioji, both of Japan

[73] Assignee: Fanuc Ltd, Minamitsuru, Japan

[21] Appl. No.: 82,633

[22] PCT Filed: Nov. 26, 1986

[86] PCT No.: PCT/JP86/00601
§ 371 Date: Aug. 20, 1987
§ 102(e) Date: Aug. 20, 1987

[87] PCT Pub. No.: WO87/03432
PCT Pub. Date: Jun. 4, 1987

[30] Foreign Application Priority Data

Nov. 27, 1985 [JP] Japan ............... 60-266616

[51] Int. Cl.⁴ ............................................. G05B 5/01
[52] U.S. Cl. ................................. 318/615; 318/561; 318/618; 364/174
[58] Field of Search .......... 318/561, 615–618; 364/174

[56] References Cited

U.S. PATENT DOCUMENTS

| | | | |
|---|---|---|---|
| 4,581,699 | 4/1986 | Delmege et al. | 364/174 |
| 4,680,581 | 7/1987 | Kurakake et al. | 318/561 |
| 4,695,780 | 9/1987 | Kurakake et al. | 318/561 |

Primary Examiner—William M. Shoop, Jr.
Assistant Examiner—Saul M. Bergmann
Attorney, Agent, or Firm—Staas & Halsey

[57] ABSTRACT

A servo control system has a first integrator to which the speed of a servomotor is fed back and a second integrator to which the speed of a mechanical load of low rigidity is fed back. The speed of the servomotor and the speed of the mechanical load driven by the servomotor are simultaneously reflected at a prescribed ratio on a transfer function of the servo control system, whereby appropriate servo control is made possible for the mechanical load to achieve speed control having a quick response and stability.

3 Claims, 3 Drawing Sheets

SPEED CONTROL SYSTEM

FIELD OF THE INVENTION

The present invention relates to a system for controlling the speed of a servomotor, and more particularly to a speed control system for a servomotor suitable for driving a load of a low rigidity.

DESCRIPTION OF THE RELATED ART

Industrial robots have a plurality of arms coupled to provide high freedom for performing a variety of operations. Since the coupled arms are in the form of a long cantilever, or due to the characteristics of a power transmission mechanism between the arms and a servomotor, the arms are inevitably of a low degree of rigidity. Regardless of being such a mechanical load of low rigidity, the industrial robot is required to have an increased operation speed and an increased operation range and to effect highly accurate positioning in order to increase its working capability.

In order to ideally control a speed control system employing a DC motor for controlling a conventional mechanical load of low rigidity, e.g., robot arms, there has been proposed a speed control system as illustrated in FIG. 2 of the accompanying drawings. Denoted in FIG. 2 at $K_1$ is an integration constant, $K_2$, $K_3$, $K_4$ proportionality constants, $Kt$ a power amplifier constant, $Jm$ a rotor inertia, $J_l$ a load inertia, and $K$ a spring constant of a rotor and load coupling. The ratio (transfer function) between an input signal $Vr$ and an output signal, e.g., a speed $Vl$ of the distal end of a robot hand, which is supplied as a feedback signal to a speed control integrator, is calculated by the following equation:

$$Vl/Vr = K_1 \cdot Kt / \{ K_1 \cdot Kt + (K_2 + K_3) Kt \cdot S + \quad (1)$$
$$(Jm + Jl + K_4 \cdot Kt \cdot Jl) S^2 + K_3 \cdot Kt(Jl/K) S^3 + Jm(Jl/K) S^4 \}$$

According the equation (1), the coefficients of the terms of the linear differential $S$ ($=d/dt$), the quadratic differential $S^2$, the third differential $S^3$ in the denominator are the products of only the proportionality constants $K_2$, $K_3$, $K_4$. Therefore, it is easy to vary these coefficients freely thereby to stabilize the speed control system. In the DC term, too, only the integration constant $K_1$ can freely be varied, independent of the proportionality constants $K_2$, $K_3$, $K_4$, to increase response time and provide protect against disturbances applied to a position control system.

Actually, however, an observer is used when producing the displacement d of a mechanical feed system or a speed signal $Vl$ at the distal end of the hand, and since the observer contains some error, it is difficult to obtain an accurate feedback signal. Heretofore, therefore, a motor speed $Vm$ is usually fed back to the integrator. In this case, the relationship between the motor speed $Vm$ and the speed $Vl$ of the distal end of the hand is expressed, using the spring constant $K$, by:

$$Vm = \{1 + (J_L \cdot S^2)/K\} Vl \quad (2)$$

The transfer function is thus given as follows:

$$Vl/Vr = (K_1 \cdot Kt)/[K_1 \cdot Kt + (K_2 + K_3) Kt \cdot S + \quad (3)$$
$$\{Jm + J_L + K_4 \cdot Kt \cdot J_L + (K_1 \cdot Kt \cdot J_L)/K\} S^2 +$$
-continued
$$K_3 \cdot Kt \cdot (J_L/K) S^3 + Jm \cdot (J_L/K) S^4]$$

Consequently, the coefficients of the quadratic differential $S^2$ include two coefficients, i.e., the proportionality constant $K_4$ and the integration constant $K_1$, thereby making it difficult to stably adjust the mechanical load of low rigidity.

More specifically, the time constant of the position control system is determined by the ratio of the coefficients of the term of the linear differential and the DC term, and is expressed by:

$$\{(K_2+K_3)Kt\}/K_1 \cdot Kt = (K_2+K_3)/K_1 \quad (3-2)$$

By suitably selecting the value of the integration constant $K_1$ with respect to $(K_2+K_3)$, the speed control system is allowed to effect accurate operation. However, since the proportionality constant $K_4$ is included in the term of the quadratic differential, the position control system cannot be balanced when selecting the value of $K_1$ in relation to $(K_2+K_3)$, resulting in the problem of impaired stability.

SUMMARY OF THE INVENTION

The present invention eliminates the problems of the conventional speed control system. It is an object of the present invention to provide a speed control system capable of stable positional control without impairing the response speed in a speed control loop by feeding back a speed signal issued as approximate data from a mechanical load, together with a motor speed, to a speed control integrator.

According to the present invention, there is provided a speed control system for controlling a servo control system with a command speed and a fed-back speed signal from a mechanical load, the speed control system comprising a servomotor for driving the mechanical load of low rigidity, means for detecting the speed of the servomotor, means for generating the speed signal from the mechanical load, first integrator means to which a speed signal of the servomotor is fed back, second integrator means to which the speed signal of the mechanical load is fed back, and means for determining a transfer function of the servo control system from the first and second integrator means.

With the present invention, the speeds of the servomotor and the mechanical load are fed back to the respective integrators in the servo control system for effecting stable servo control.

DESCRIPTION OF THE PREFERRED EMBODIMENT

An embodiment of the present invention will hereinafter be described in specific detail with reference to the drawings.

Figure 1:
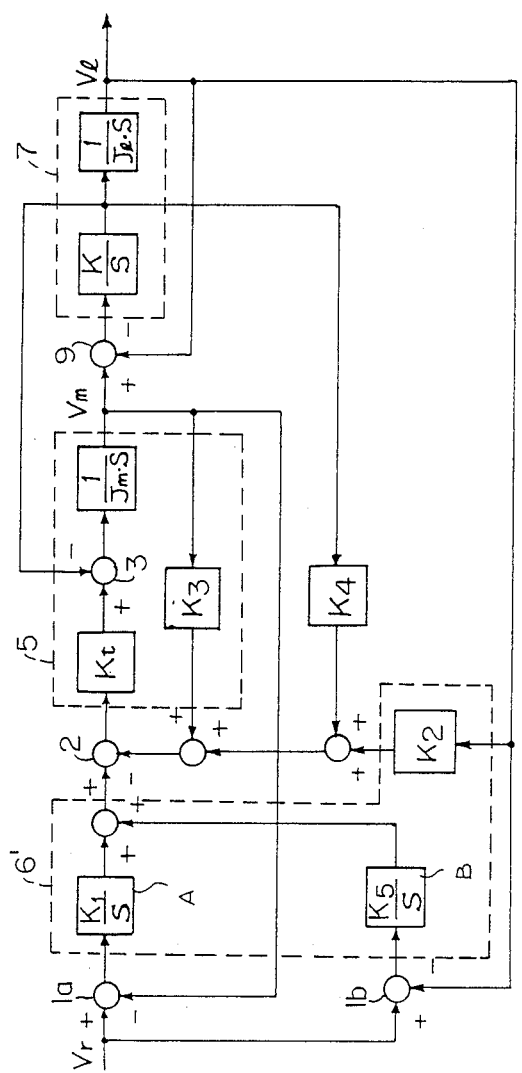
FIG. 1 is a block diagram of an embodiment of the present invention.
Figure 2:
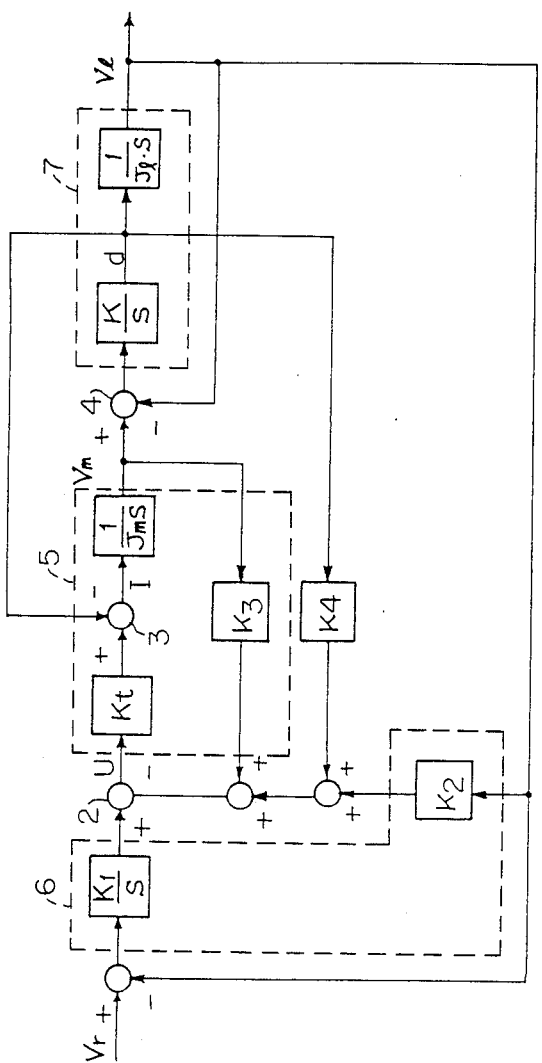
FIG. 2 is a block diagram of a servo control system in which the speed of a distal end of a mechanical load is fed back for control.

FIG. 1 is a block diagram of a speed control system according to the present invention, which includes calculating units 1a, 1b, 2, 3 and 9, a PI controller 6', a motor 5, and a mechanical load 7. The present invention resides in that a servo control system has separately an integrator A to which a motor speed Vm is fed back and an integrator B to which a speed Vl of a distal end of a mechanical load is fed back. Assuming that $K_1$ indicates an integration constant with respect to a motor speed and $K_5$ indicates an integration constant with respect to a mechanical load speed, a transfer function of FIG. 1's network as it is enlarged with respect to two signals indicative of the motor speed and the mechanical load speed is expressed as follows (where $K_4$ has no meaning for a motor speed):

$$Vl/Vr = (K_1 + K_5)Kt/[(K_1 + K_5) \cdot Kt + (K_2 + K_3)KtS + \qquad (4)$$
$$\{Jm + Jl + (K_1 \cdot Kt \cdot Jl/K)\} S^2 +$$
$$(K_3 \cdot Kt \cdot Jl/K) S^3 + (Jm \cdot Jl/K) S^4]$$

A transfer function as it is enlarged with respect to the mechanical load speed is as follows, with Km being an integration constant with respect to the load speed:

$$Vl/Vr = Km \cdot Kt/[Km \cdot Kt + (K_2 + K_3 \{Kt \cdot S + \qquad (4\text{-}2)$$
$$(Jm + Jl + (K_4 \cdot Kt \cdot Jl/K)\} S^2 +$$
$$(K_3 \cdot Kt \cdot Jl/K) S^3 + (Jm \cdot Jl/K) S^4]$$

Since the coefficients of the linear differential and the third differential are the same in the equations (4) and (4-2), the integration constants $K_1$, $K_5$ should be determined so that $$K_1 + K_5 = Km \qquad (5)$$

can be met in order to equalize the coefficients except for the term of the quadratic differential. At this time, the control system is balanced.

The coefficient should be selected so that the denominator will coincide with the Butterworth pattern with respect to the enlarged type for the load speed. The Butterworth pattern is represented by:

$$[1, 1, 0.5, 0.15, 0.03, 0.003, \ldots] \qquad (6)$$

Since the coefficient of the term of the quadratic differential can freely be changed by the proportionality constant $K_4$, the following equations can be established with respect to the coefficients of the terms of the linear, third, and fourth differentials:

$$S: G_1 = (K_2 + K_3)/Km = \sigma \qquad (7)$$

$$S^3: G_3 = (K_3 \cdot J)/(K \cdot Km) = 0.15\sigma^3 \qquad (8)$$

$$S^4: G_4 = (1/Km \cdot Kt)(Jm \cdot Jl/K) = 0.03\sigma^4 \qquad (9)$$

At this time, the coefficient of the quadratic differential of the enlarged transfer function with respect to the two outputs, i.e., the motor speed and the load speed is given by:

$$S^2: G_2 = \{1/(K_1 + K_5)Kt\} \{Jm + Jl + (K_1 \cdot Kt \cdot K1)/K\}$$
$$= \{(Jm + Jl)/(Km \cdot Kt)\} + (K_1 \cdot Jl)/(Km \cdot K) \qquad (10)$$

Since $(1/Km \cdot Kt) \cdot (Jm \cdot Jl/K) = 0.03\sigma^4$ from the equation (9), $$G_2 = \{K \cdot (Jm + Jl)/(Jm \cdot Jl)\} \times 0.03\sigma^4 + (K_1/Km) \cdot (Jl/K) \qquad (11)$$

If $\omega n^2 = \{K \cdot (Jm + Jl)/(Jm \cdot Jl)\} \qquad (12)$ and assuming that $$Jm = Jl \qquad (13)$$

$$\omega n^2 = (2 \cdot K)/Jl \qquad (14)$$

Therefore, $$G_2 = \omega n^2 \times 0.03 \sigma^4 + (K_1/Km) \cdot (2/\omega n^2) \qquad (15)$$
$$= \{\omega n^2 \times 0.03 \sigma^2 + (K_1/Km) \cdot (2/\omega n^2 \sigma^2)\} \sigma^2$$

If $\omega n^2 \sigma^2 = \alpha \qquad (16)$ then $$G_2 = \{0.03\alpha + (K_1/Km)(2/\alpha)\}\sigma^2 \qquad (17)$$

If, for example, $\sigma = 5.3 \times 10^{-3}$, $Wn = 2\pi \times 8$, then the Butterworth coefficient $W_2$ is calculated as follows:

$$BW_2 = 2.12 \times 10^{-3} + (K_1/Km) \times 28.18 \qquad (18)$$

Figure 3:
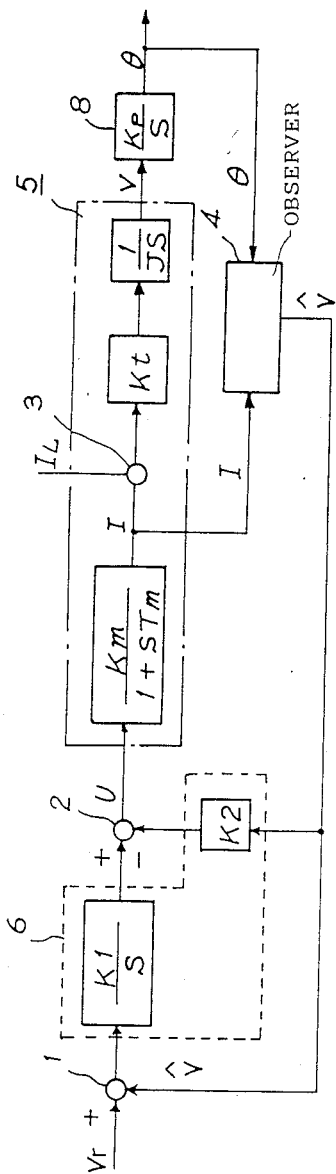
FIG. 3 is a block diagram explaining the principles for estimating a speed with an observer.

An observer may be used to estimate the speed of the distal end of the mechanical load. The observer estimates a value for the speed from the output torque of the motor and the position of the motor. The process of estimating the speed with the observer has been proposed in Japanese Laid-Open Patent Publication No. 60-200788 filed by the present applicant. The process of estimating the speed with the observer will be described with reference to the block diagram of FIG. 3. Designated by reference characters 1, 2, 3 are calculating units, 4 an observer, 5 a motor, 6 a P1 controller, 8 a rotary encoder, $\theta$ a position of the motor, V a speed of the motor, U a torque command, I a motor current, and $\hat{V}$ an estimated speed value. Operation of this control system will be described below.

The difference between a speed command value Vc and an estimated speed value $\hat{V}$, described later, is output from the calculating unit 1. The output signal from the calculating unit 1 is integrated and then applied to the calculating unit 2. The estimated speed value $\hat{V}$ as multiplied by a feedback gain $K_2$ is also applied to the calculating unit 2. The difference between the input signals applied to the calculating unit 2 is ouptut as a torque command U for controlling the motor 5. The speed of the motor 5 is issues as V, and the position $\theta$ of the motor 5 is detected by the rotary encoder 8. Information of the position $\theta$ includes a current $I_L$ indicative of a load torque (coulomb friction) and added by the calculating unit 3.

Where the observer 4 is used to obtain an estimated speed value $\hat{V}$, a load torque which is responsible for a normal estimation error is simultaneously estimated. More specifically, the motor current I and the positional information $\theta$ taking into account $I_L$ representing the load torque are applied to the observer 4, which then issues the estimated speed value $\hat{V}$.

The above process will be described in greater detail. A unidimensional observer constructed of the motor current I, the speed V, the position $\theta$, and the current $I_L$ based on the load torque is given as follows:

$$\begin{bmatrix} \hat{\theta} \\ V \\ I_L \end{bmatrix} = \begin{bmatrix} 0 & Kp & 0 \\ 0 & 0 & -Kt/J \\ 0 & 0 & 0 \end{bmatrix} \begin{bmatrix} \theta \\ V \\ I_L \end{bmatrix} + Kt/J \begin{bmatrix} 0 \\ 1 \\ 0 \end{bmatrix} I$$

The motor current I and the position $\theta$ are actually detected and applied to the observer 4. An identity observer for digital processing is given by:

$$\begin{bmatrix} \hat{\theta}n+1 \\ \hat{V}n+1 \\ \hat{I}_Ln+1 \end{bmatrix} = \begin{bmatrix} 1-\lambda_1 KpT & \frac{-KpKt}{2J}T^2 & T^2 \\ -\lambda_2 & 1 & \frac{-Kt}{J}T^2 \\ -\lambda_3 & 0 & 1 \end{bmatrix} \begin{bmatrix} \hat{\theta}n \\ \hat{V}n \\ \hat{I}_Ln \end{bmatrix} +$$

$$\begin{bmatrix} \lambda_1 \\ \lambda_2 \\ \lambda_3 \end{bmatrix} \theta + \frac{Kt}{J} \begin{bmatrix} \frac{Kp}{2}T^2 \\ T \\ 0 \end{bmatrix} I$$

where T is a sampling period, and $\lambda_1$, $\lambda_2$, $\lambda_3$ are observer gains which are in inverse proportion to a time in which the estimated value converges to a real value.

The above observer is realized by the following algorithm in order to process the same with a microprocessor:

$$\Delta \hat{\theta}m + 1 = \lambda_1 \sum_{j=0}^{m} (\Delta \hat{\theta}j - \Delta \theta j) + KpT\hat{V}m +$$

$$\frac{KpKT}{2J} T^2 (Im - \hat{I}_Lm).$$

$$\hat{V}m + 1 = \hat{V}m + \lambda_2 \sum_{j=0}^{m} (\Delta \theta j - \Delta \hat{\theta}j) + \frac{KtT}{J}(Im - \hat{I}_Lm)$$

$$\hat{I}_Lm + 1 = \hat{I}_Lm + \lambda_3 \sum_{j=0}^{m} (\Delta \theta j - \Delta \hat{\theta}j)$$

Since the motor speed can be estimated by the observer, it is apparent that the machine speed can also be estimated by the observer in the control system of the invention as shown in FIG. 1.

Although a certain preferred embodiment has been shown and described, it should be understood that the invention is not limited to the illustrated embodiment, but many changes and modifications may be made therein without departing from the scope of the present invention.

According to the present invention, as described above, the speed of a motor and the speed of a distal end of a machine are fed back respectively to individual integrators in a servo system for speed control in a system for controlling a mechanical load of low rigidity such as a robot hand or the like. Therefore, the speed control system is quick to respond and highly stable, and is preferably used in a speed control system for controlling a servomotor for driving a load of low rigidity.

We claim:

1. A speed control system for controlling a servo control system having a transfer function with a command speed signal and a fed-back speed signal from a mechanical load, said speed control system comprising:

a servomotor for driving a mechanical load of low rigidity;

means for detecting the speed of said servomotor;

generator means for generating a speed signal representative of the speed of the mechanical load;

first integrator means to which a speed signal of said servomotor is fed back for providing a first integration signal responsive to an integration of the speed signal of said servomotor;

second integrator means to which the speed signal of the mechanical load is fed back for providing a second integration signal responsive to an integration of the speed signal of the mechanical load; and means for determining a value of the transfer function of the servo control system based on the first and second integration signals.

2. A speed control system according to claim 1, wherein said generator means comprises observer means for providing, as the speed signal of the mechanical load, an estimation of the mechanical load based on a load torque of said servomotor and a positional signal of said servomotor.

3. A speed control system according to claim 1, wherein the transfer function of the servo control system is the ratio between an input speed command signal and a mechanical load speed signal.

* * * * *

UNITED STATES PATENT AND TRADEMARK OFFICE
CERTIFICATE OF CORRECTION

PATENT NO. : 4,816,734
DATED : March 28, 1989
INVENTOR(S) : Mitsuo Kurakake

It is certified that error appears in the above-identified patent and that said Letters Patent is hereby corrected as shown below:

Column 3, lines 23-28, Equation 4.2 should read:

$$--V\ell/Vr = Km \cdot Kt/[Km \cdot Kt + (K_2 + K_3) Kt \cdot S + Jm + J\ell$$
$$+ (K_4 \cdot Kt \cdot J\ell/K) S^2 + (K_3 \cdot Kt \cdot J\ell/K) S^3$$
$$+ (Jm \cdot J\ell/K) S^4] \ldots (4-2) --.$$

Col. 4, line 5, "(Jm-Jl)/" should be --(Jm+Jl)/--;
    line 24, "Wn" should be --wn--;
    line 25, "$W_2$" should be --$BW_2$--;
    line 39, "Pl" should be --PI--;
    line 44, "Vc" should be --Vr--;

Col. 5, line 30, should read $$--\Delta\hat{\theta}m + 1 = \lambda_1 \sum_{j=0}^{m} (\Delta\theta j - \Delta\hat{\theta}j) + Kp T \hat{V}m + --.$$

Signed and Sealed this

Seventh Day of November, 1989

*Attest:*

JEFFREY M. SAMUELS

*Attesting Officer*    *Acting Commissioner of Patents and Trademarks*